United States Patent [19]
Lindsley

[11] 3,755,076
[45] Aug. 28, 1973

[54] NUCLEAR POWERED ENERGY CONVERSION SYSTEM

[76] Inventor: Thayer Lindsley, 660 Madison Ave., New York, N.Y. 10021

[22] Filed: Dec. 3, 1971

[21] Appl. No.: 204,572

[52] U.S. Cl................ 176/39, 60/20, 60/55, 60/102
[51] Int. Cl. ............................................. G21d 5/00
[58] Field of Search ................. 176/39; 60/6, 55, 60/102, 20

[56] References Cited
UNITED STATES PATENTS
1,769,671  7/1930  Bjerregaard.................. 60/55 UX
2,801,069  7/1957  Campbell........................ 60/55
3,599,424  8/1971  Yampolsky...................... 60/20

FOREIGN PATENTS OR APPLICATIONS
498,700  5/1930  Germany....................... 60/26

Primary Examiner—Reuben Epstein
Attorney—Dean S. Edmonds, James W. Laist et al.

[57] ABSTRACT

An energy recovery system employing a remotely positioned underground nuclear generator and associated heat and hydrodynamic conversion means.

3 Claims, 1 Drawing Figure

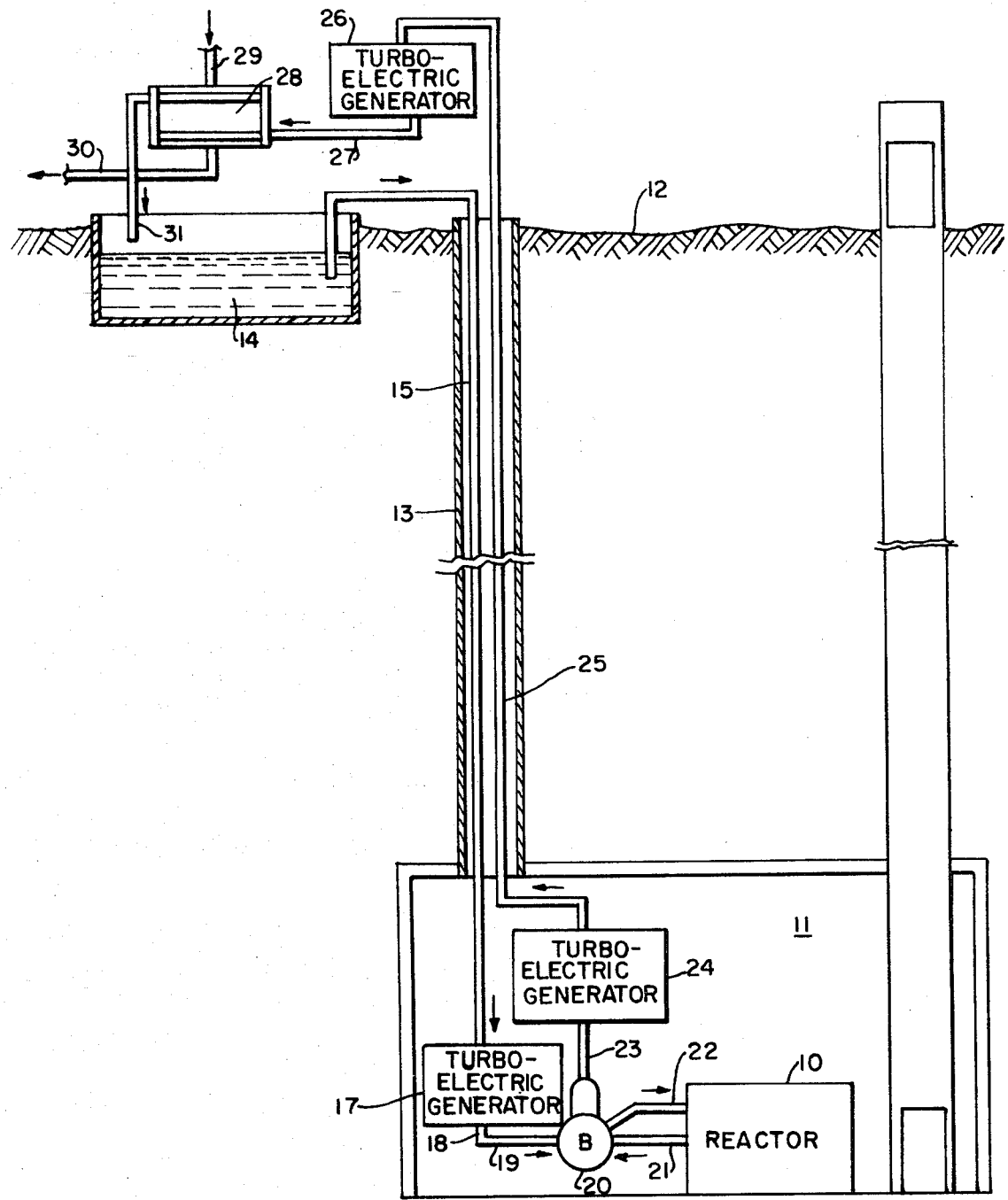

NUCLEAR POWERED ENERGY CONVERSION SYSTEM

BACKGROUND OF THE INVENTION

The use of fossil fuels as industrial energy sources inevitably must decline as world supply, which is finite, is depleted. Moreover, the United States has become increasingly dependent upon foreign sources for supplies of its crude oil. Thus, worldwide depletion, and loss of domestic capacity make it imperative that nuclear power become the energy source of choice.

One aspect of nuclear power which has severely inhibited its use in populated areas has been the fear by the general public of radiation contamination and explosion. Yet, economic and industrial analyses frequently dictate that the location of nuclaear plants be in populated areas. Power companies have learned that perhaps the principal obstacle to be overcome in such cases is not technological per se but rather, the reaction of various civic groups which may involve time consuming public hearings and sometimes litigation.

It is the purpose of the present invention to provide a nuclear power system and disposition of components thereof which obviates the foregoing difficulty.

SUMMMARY OF THE INVENTION

In accordance with the invention, a nuclear reactor is disposed in a deep underground chamber which due to the intervening earth crust, will wholly protect areas above ground from possible radiation contamination or nuclear explosion. The nuclear reactor powers a boiler to which water flows from an above-ground source, a hydrodynamic turbine receiving the water prior to entry into the boiler to withdraw and convert energy therefrom into electrical power. Steam generated by the nuclear fired boiler is fed underground to a steam turbine which drives an electric generator at high temperature and pressure and after the partially exhausted steam has passed to the surface, it is fed successively to a second low pressure temperature turbine generator and to a condenser, from which the condensate is fed to the underground hydrodynamic turbine.

BRIEF DESCRIPTION OF THE DRAWING

The single FIGURE represent schematically a nuclear power generating system in accordance with the invention.

DESCRIPTION OF A PREFERRED EMBODIMENT

In the drawing, reference numeral 10 designates a nuclear reactor which is located underground in a chamber 11, serviced and connected to the ground surface 12 by an equipment and personnel shaft 13. It will be understood that the arrangement as shown is merely schematic and that the vertical distance from the surface level 12 to the reactor 10 may be in the order of several thousand feet. The distance underground should be entirely sufficient to assure that in the event of shielding about this reactor should fail, or if the means inhibiting uncontrolled nuclear reaction should fail, there would, in either eventuality be sufficient solid earth between the surface and the reactor to entirely protect the adjacent surface population from harm.

In accordance with further aspects of the nuclear powered system, water from a source 14 will flow into the vertical conduit 15 and down through the height of the shaft. In its descent through conduit 15, the water will have acquired considerable energy and consequently, a hydroelectric generator 17 has been provided at the bottom of shaft 16 to convert the energy of the water into electrical energy.

Water passing from the outlet 18 of hydroelectric generator 17, flows through a horizontal conduit 19 to a boiler 20 as shown by the arrow indicating flow. The reactor 10 fires the boiler 20 by means of a closed loop indicated by reference numerals 21 and 22, through which liquid sodium or other suitable heat exchange medium is circulated. As a result of such heat exchange boiler 20 will convert intake water into high pressure, high temperature steam.

Steam from boiler 20 flows through a conduit 23 to a high temperature, high pressure steam turbo-electric generator 24 which converts part of the heat energy generated by the reactor 10 into electrical energy.

A well-insulated vertical steam conduit 25 conducts steam exhaust from the high pressure turbine to the surface level when it flows into a relatively low pressure turbo-electric generator 16. Turbo-electric generator 26 will extract additional energy from the steam. The exhaust steam from this turbine passes through a conduit 27 to a condenser 28 having inlet and outlet water cooling means 29 and 30.

The condensate which issues from the condenser at 31 is recirculated to the source 14 and to the vertical conduit 15.

The above described nuclear powered energy conversion system overcomes many of the most serious objections raised by civic groups to the use of nuclear energy in populated areas, without sacrificing efficiency in the energy conversion. It will be understood that the description has been of a preferred embodiment and that in order to determine the scope of the invention reference should be made to the appended claims.

I claim:

1. A system for the conversion of nuclear energy to electric power which minimizes radiation contamination, thermal pollution and the danger of nuclear explosion comprising, a nuclear reactor, a steam boiler in heat exchange relation with said reactor, said nuclear reactor and boiler being located in a chamber at a distance below ground level sufficient to shield by the interposition of the earth's crust surface areas above said reactor from nuclear radiation and sufficient to contain any nuclear explosion due to malfunction of said reactor, a shaft connecting said chamber to the surface level of the ground, a vertical conduit in said shaft for the transmission of water therethrough, a hydroelectric generator generally at the same level as said reactor connected to said conduit for receiving a descending column of water therein to generate electric power, means connecting the outlet of the hydro-generator to said boiler, steam conduit means in said shaft connected to said boiler for conducting steam generated in said boiler to said surface level, and steam turbo-electric generator means connected to said steam conduit for converting heat energy in the form of steam produced by said boiler into electrical energy.

2. The system according to claim 1 wherein high temperature, high pressure steam turbo-electric generator means is located generally at the same level as said boiler and reactor for partially converting heat energy in the form of steam to electrical energy, and a second lower temperature lower pressure steam turbo-electric generator means is connected to said steam conduit above said surface level for converting the remainder of said heat energy in the form of steam to electrical energy.

3. The system according to claim 2 which includes a condenser located above surface level for receiving steam exhaust from the steam turbo-electric generator means, means for cooling said condenser, outlet means from said condenser and means for recirculating condensate water from said condenser to said conduit.

* * * * *